United States Patent
Grenot et al.

(10) Patent No.: US 7,333,434 B2
(45) Date of Patent: Feb. 19, 2008

(54) DYNAMIC OPTIMIZATION PROCESS OF QUALITY SERVICE IN A DATA TRANSMISSION NETWORK

(75) Inventors: Thierry Grenot, Clamart (FR); Francois Lecerf, Sevres (FR); Jean-Yves Leclerc, Paris (FR)

(73) Assignee: IPANEMA Technologies, Fontenay-aux-Roses (FR)

(*) Notice: Subject to any disclaimer, the term of this patent is extended or adjusted under 35 U.S.C. 154(b) by 1060 days.

(21) Appl. No.: 10/182,894

(22) PCT Filed: Feb. 2, 2001

(86) PCT No.: PCT/FR01/00324

§ 371 (c)(1),
(2), (4) Date: Dec. 2, 2002

(87) PCT Pub. No.: WO01/58094

PCT Pub. Date: Aug. 9, 2001

(65) Prior Publication Data

US 2003/0206517 A1   Nov. 6, 2003

(51) Int. Cl.
*H04L 12/26* (2006.01)
*G08J 3/16* (2006.01)

(52) U.S. Cl. ......................... 370/235; 370/468
(58) Field of Classification Search ............... 370/229, 370/230, 231, 235, 230.1, 237, 255, 252, 370/241, 248, 253, 232, 239, 240
See application file for complete search history.

(56) References Cited

U.S. PATENT DOCUMENTS

| | | | |
|---|---|---|---|
| 5,359,593 A | 10/1994 | Galand et al. | 370/234 |
| 5,936,940 A | 8/1999 | Marin et al. | 370/232 |
| 6,094,418 A * | 7/2000 | Soumiya et al. | 370/231 |
| 6,226,265 B1 * | 5/2001 | Nakamichi et al. | 370/235 |
| 6,345,039 B1 * | 2/2002 | Ito | 370/232 |
| 6,804,244 B1 * | 10/2004 | Anandakumar et al. | 370/395.21 |
| 6,965,943 B1 * | 11/2005 | Golestani | 709/235 |
| 6,990,074 B2 * | 1/2006 | Wan et al. | 370/235 |

* cited by examiner

*Primary Examiner*—Kwang Bin Yao
*Assistant Examiner*—Warner Wong
(74) *Attorney, Agent, or Firm*—Oblon, Spivak, McClelland, Maier & Neustadt, P.C.

(57) ABSTRACT

A dynamic optimization process of a quality of service (QoS) in a data transmission packet network. The data transmission packet network includes a plurality of sources and a plurality of destinations connected to a transit network by a plurality of access networks. Each source is configured to send data at a maximum data rate and each destination is configured to receive a maximum transmission data rate. The sources each includes a classification and a control device configured to control a transmission data rate of transmitted data. The process is characterized in that the absolute transfer delay period, the jitter, the output of the exchanged data and the losses between each source S and each destination D are measured, and the classification and control means of the output are monitored.

12 Claims, 4 Drawing Sheets

DYNAMIC OPTIMIZATION PROCESS OF QUALITY SERVICE IN A DATA TRANSMISSION NETWORK

The present invention relates to a process and a dynamic optimization device of quality service in a data transmission packet network, where said network consists of a multitude of sources Si and a multitude of destinations Di connected to a transit network via a multitude of access networks, where each source is capable of sending a maximum output $L_{MAX, 1, X}$ and each destination is capable of receiving a maximum output $L_{MAX, X, D}$, where said sources each consist of a classification and control means for the output of transmitted data.

This process and this device may be implemented whatever the geographical area of the network, whatever the output transmitted by the network and whatever the number of users of this network.

The telecommunications packet network are characterised in that the transmitted information are carried in groups known as packets and essentially consist of the following:

A header containing transport information of the packet in the network.

Data to be transmitted.

The addressing information contained in the headers allows the information flow between final applications to be identified. These packets are carried throughout the network, and according to this network, use the most varied transmission and commutation means.

The main technology currently used for these telecommunication packet networks is the IP protocol (Internet Protocol). This end-to-end protocol can work on very diverse transmission networks.

FIG. 1 shows an example of such a network.

Users may be either individuals, or agencies, companies (with their own internal local area network), etc.

The transit network represents the central part, generally of large capacity and covering an extensive territory (the entire world in the case of the Internet network). This network is generally shared by a multitude of users and/or private networks.

The access networks generally have an average or slow transfer rate, and are shared amongst users located in a limited geographical area. The "local loop", namely wire, optical, radio, etc. connection, between the user and the access service provider is subsequently considered as being part of the access network.

FIG. 2 shows different possible cases of access networks. The written agreements are the following:

For Networks:

Carrier: carrier of vast quantities of information over long distances. It is also the interconnection point between other carriers, thereby enabling interoperability between users of different Internet Service Providers ISP as in the case of the Internet network.

Internet Access Provider IAP: access provider to the network. It gathers the traffic on behalf of the ISP, where the latter typically provides its users with various servers for authentication, website hosting, price setting, electronic mail and so forth in addition to access to the transit network.

Local Loop: Connection (wire link, optical, radio and so forth) linking user to network.

TELCO: Telephone operator, often the owner of the local loop.

For Equipments:

Customer Premises Equipment CPE: user equipment connected to the network (generally, an access router).

MUX: multiplexer/demultiplexer (there are various types, such as telephone, XDSL, SDH and so on).

Network Access Server NAS: access server to the network, which may also be an access router.

R: router (or switch).

There are also various configuration possibilities. Each apparatus (CPE, MUX, NAS, R, and so on) corresponds to a function that concentrates traffic and enables telecommunication resources to be shared.

With the incredible development of information exchange throughout telecommunication networks, it has become essential for operators to ensure their clients receive a quality service. The Quality Service includes all pertinent characteristics that affect information transfer between two given points of a network. They are particularly the following:

Quality of access service.

Availability of service.

Time to restart service in case of fault.

Quality of information transfer service.

Delay period for information transfer between the source and destination.

Variation in delay period for information transfer (the jitter).

Corruption of carried information (losses, errors).

A major problem is due to the fact that the geographical spread, the mutually dependent infrastructure equipments between very many users, the variety of flow exchanged and the complexity of architectures used makes both the prediction and guarantee of Quality Service on such networks very difficult. The possible output passing between two given users, the delay period for information transfer, the variation in this delay period (the jitter) and the associated rates of loss are core components of this Quality Service. Provision of critical professional services (transmission of voice, images, critical data, electronic commerce and so on) is dependent on the efficient control of these components.

A common way of improving quality service is to increase proportions in network capacity. Nevertheless, given the significant costs in investment and use of these networks, it is desirable that these networks to be used to their maximum and such a costly solution is therefore of limited use.

Devices (protocols, equipments for transmission, commutation, routing and so forth) that depend upon the nature of different networks may be implemented to manage these components of Quality Service. They are generally based on mechanisms that prioritise and reserve resources upon demand (ATM, RSVP on IP, and so on) or configuration (ATM, DiffServ on IP, and so on) These devices generally have a limited impact on only a part of the network. As they are constantly changing, they inter-operate difficultly.

In all cases, the result is strongly dependent on the behaviour of source users, such as transmission output, traffic regularity, traffic matrix, and so on. This behaviour is very difficult to predict given the great variety of applications that use the networks (transmission of voice and images, file transfer, database consultation and so forth), the large amount of different users brought together and the extensive range of their requirements.

Equally in all cases, the result is strongly dependent on rules of engineering and configuration of multiple network parameters. These rules are very difficult to determine, particularly due to the size of networks, the great variety of technologies implemented at any given time (non homogeneous number) and the multitude of organisations (access service operators, point of presence operators, long distance service carriers and so forth) involved throughout the path.

In addition, the Quality Service is mainly linked to congestion of the different network components used by information during transfer. Although there may be an infinite gradation scale, functioning circumstances may be illustrated in a diagram by these two following modes:

Either, there is no resource reservation and the network relays the information at best to the destination party.

Or, there is a resource reservation and the amount of information injected into the network is more or less statistically controlled.

In all cases, temporary storage systems that are held in line (memory) and located at each point of multiplexing, merging or commutation allow the simultaneous arrivals of packets to be handled. The instantaneous memory rate for a packet and the management policy (priority, number held in line, dumping rule, reject and so forth) implemented for each queue determine the time it takes for a packet to travel through this device leading to its possible rejection.

The delay period for transfer between two network points is due to:

The total delay time of queues, cables, fibre optics, satellite links and others used. This delay is generally set and essentially depends on the medium and information travel distance.

The total delay time of queues in different equipments. Overall, this delay is due to the instantaneous charge for each packet and the management policies of these queues. Too strong an instantaneous charge will force an information packet to be rejected (loss). This is the phenomenon that explains the loss of packets.

This transfer delay period is therefore sensitive to the instantaneous charge, "seasonal" variations (day/night cycles, peak times and so on) and configuration changes (paths used in the network for example). The variation in the transfer delay period is usually around (if not, above) its average value, be it short term (instantaneous congestion) or long term (activity cycle of users).

A more detailed analysis of these congestion phenomena enables the problem to be broken down. By backtracking on the travel path of a packet, the following three segments may be referred to as follows:

Delay period, variation in delay period and losses due to the charge of the access network towards a given user, where the access network is generally slower than the transit network. Total flow towards this user may thus exceed this network capacity. Behaviour here is essentially bound to behaviour of sources generating packets to the relevant user.

Delay period, variation in delay period and losses due to the charge of the transit network are attributable to the consequent behaviour of a multitude of sources. There is only minor correlation with the traffic towards a given user. The transit network may be seen as a propagation environment whose characteristics (delay period, variation in delay period, losses) are 1) slow variables and relative to packet transmission periods, and 2) independent of packet transmission of a given source.

Delay period, variation in delay period and losses due to the charge of a user's access network (towards the transit network) are notably linked to the amount of information transmitted by the relevant user.

A known congestion control method in telecommunication packet networks is described in the American patent U.S. Pat. No. 5,936,940 "Adaptive rate-based congestion control in packet networks". The principle suggested in this patent is illustrated in FIG. 3 and consists in differentiating the "network delay period" that represents the empty delay period (transmission lines and so on) from the "queue delay period" that depends upon the injected traffic and represents the state of congestion in the system. Test packets are stamped with hour and date according to local time during their transmission and receipt. The estimated "queue delay period" is based on the difference of inter-arrival and inter-departure intervals that separate the consecutive test packets.

The recurrent estimate formula and its below-zero demarcation allows the "network delay period" to be freed from the minimum encountered delay period that represents the set part of the delay period. This "absolute" information is used to master the sources. The estimated "queue delay period" therefore serves as an indicator to classify the state of the network into a few categories. According to the state of the network, an exit limiter on the source is adjusted with a non-linear function.

A drawback to this method arises from the fact that it is based on relative measures providing an idea of the congestion variation but not indicating the seriousness of this congestion. This does not make a real optimization very easy. Further, the devices present initialization problems. In addition, these partial or indirect measures only provide a fragmented view of the situation of the observed network and are not linked to quantifiable targets of the Quality Service noticed by network users. Moreover, test packets in modem networks are not representative of useful packets because of the large variety of paths, especially in devices with queuing systems. Also, the injection of test packets does not allow for a satisfactory measuring number and may even generate an exaggerated charge. Let us further note that the suggested mechanisms assume that all network sources behave identically, which is not the case in the large networks already being used.

The object of the invention is a process and a device enabling the use and the Quality Service of packet networks, more particularly networks using the IP protocol, to be optimised.

Another object of this invention is a process and a device enabling the congestion of the access network to a user to be dynamically managed, and particularly, when the congestion point on this access network is not located on the access line itself and when the congestion level varies in time. Management of this congestion enables the charge to be increases whilst also controlling delay periods, the jitter and losses.

Another object of this invention is a process and a device enabling the congestion of the access network away from a user to be dynamically managed, and particularly (but not only), when the congestion point on this access network is not located on the access line itself and when the congestion level varies in time. Management of this congestion enables the charge to be increases whilst also controlling delay periods, the jitter and losses.

Another object of this invention is a process and a device enabling the congestion of the transit network to be dynamically managed, and when the congestion level varies in time, in that management of this congestion enables other telecommunication means to be used advisedly.

In order to meet these targets, the process according to the invention consists of the following stages:

a. Measuring the absolute transfer delay period, the jitter, the output of said exchanged data and the losses between each source S and each destination D, and performing the following sub-stages depending on the measures obtained during this stage a:

a1. for each destination D, distributing the maximum output $L_{max, x, d}$ amongst the different sources.

a2. for each destination D, determining dynamically the access network congestion point limit that optimises the maximum output $L_{max, x, d}$.

a3. for each source S, determining dynamically the access network congestion point limit that optimises the overall maximum output $L_{max, s, x}$ and the maximum output towards each destination $L_{max, s, d}$.

a4. for each source S, determining the impact of the transit network congestion, and b. Monitoring the classification and control means of the output according to the results from the sub-stages a1, a2, a3 and a4.

Preferably, stage a1 consists of the following operations:

Setting the maximum output $L_{max, x, d}$ according to the output of the access line on the one hand, and stage a2, on the other.

Sharing said maximum output $L_{max, x, d}$ amongst the active sources of the sub-network so as to define a first value of maximum output $L_{max, s, d}$ for each source, where said sharing is done by taking configuration data and possible dynamic output reservations $R_{s, d}$ into account by all or some sources.

Transmitting the first value $L_{max, s, d}$ towards each source.

Stage a2 consists of the following operations:

calculating a first delay period value representing a delay period weighting between each source and said destination.

calculating a first jitter value representing a jitter weighting between each source and said destination.

calculating a first loss value representing a loss weighting between each source and said destination.

determining the curb of weighted values according to the output received by this destination.

setting a maximum output $L_{max, x, d}$ value according to said curbs.

Stage a3 consists of the following operations:

Calculating a first delay period value representing a delay period weighting between said source and each said destination.

Calculating a first jitter value representing a jitter weighting between said source and each said destination.

Calculating a first loss value representing a loss weighting between said source and each said destination.

Determining the curb of weighted values depending on the output transmitted by said source (overall and towards each destination).

Determining an overall maximum output $L_{max, s, x}$ value and a second maximum output value by direction $L_{max, s, d}$ are set in relation to said curbs, output from line towards access network, configuration and data and possible dynamic reservations of output $R_{s, d}$ towards all or some destinations.

Stage a4 consists of the following operations:

Comparing the measures of delay period, jitter, loss and output and the results from stages a1, a2 and a3 with predefined values of delay period, jitter, loss and output.

Establishing a diagnosis on the quality service in relation to this comparison.

According to a second characteristic of the invention, the process further includes a stage that consists in transmitting, through output control, the smallest value amongst said first and second maximum output $L_{max, s, d}$ values.

This process is implemented by a device consisting of the following:

Means to measure the absolute delay period for transfer, jitter, output of exchanged data and losses between each source S and each destination D.

Means to distribute the maximum output $L_{max, x, d}$ amongst the different sources for each destination D.

Means to dynamically determine the limit congestion point of the access network by optimising the maximum output $L_{max, x, d}$ for each destination D.

Means to dynamically determine the limit congestion point of the overall access network and towards each destination for each source S.

Means to determine the impact of congestion in the transit network towards each destination for each source S.

Means to classify and control output.

Means to monitor the control output means.

Preferably, said device further comprises a module M1, responsible for dynamically determining a first maximum information quantity $L_{max, s, d}$ that a source S may send to a destination D, a module M2, responsible for dynamically determining the overall maximum output $L_{max, x, d}$ that destination D may receive to have optimum use of the access line whilst monitoring Quality Service, a module M3, responsible for dynamically determining the overall maximum output and in that source S may transmit by destination to have an optimum use of the access line whilst monitoring Quality Service, a module M4, responsible for determining the characteristics of the transit network and to order a network selector, and a module M5 for dynamically setting the limiters' value of source S in relation to values from modules M1 and M3.

The parameters for module M1 are as follows:

Output flows measures.

The maximum value $L_{max, x, d}$ that destination D may receive from all sources Si, as determined by module M2.

Possible output reservations $R_{s, d}$ between each source S and destination D.

Module M2 calculates, by using measures of Quality Service, the Quality Service weighted variables between all sources Si and provides the maximum output $L_{max, x, d}$ that destination D may receive from the network.

Module M3 calculates, by using measures of Quality Service, the Quality Service weighted variables between all destinations Di and provides the maximum output that source S may transmit to the network and the maximum output that source S may transmit to each destination $D_i$.

Module M4 establishes a diagnosis on the quality service between the source S and each destination Di so as to monitor the selector that directs all or some of the traffic to another network.

The process and device according to the invention provide the following advantages:

A dynamic adaptation to characteristic changes in Quality Service for transit networks, with both entry access and exit access.

A dynamic adaptation of various quality criteria, such as delay period, jitter and loss. The combination of criteria is also possible.

All users of relevant networks need not keep to the same mechanisms. This point makes the introduction and use of the device on the already exhibited networks far easier.

A dynamic maximization of output within absolute and exact limits (and not only relative) of transit, jitter and loss times.

A dynamic maximization of quality service (minimization of delay period, jitter and loss) within absolute and exact limits for a given output.

A dynamic maximization of the combination (Quality Service and output) in relation to criteria adapted to each user flow.

An optimised use of several networks in relation to the presented charge, effective quality service, relevant prices, quality service objective, and price targets (choice of network, choice of service type offered and so on).

Other characteristics and advantages of this invention will be evident through the following description, taken by way of example only and in reference to the attached figures.

Figure 1:
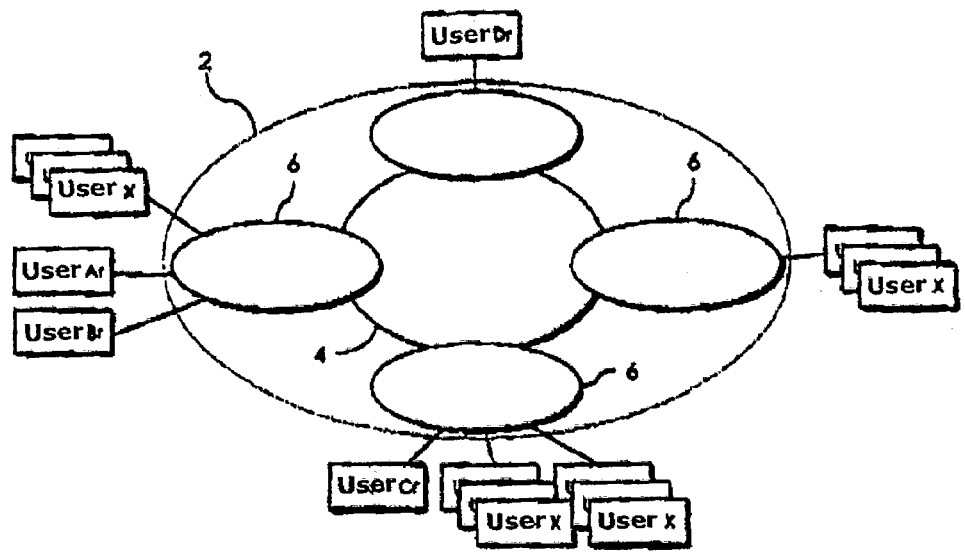
FIG. 1 shows a general outline of a transmission network in which the process according to the invention is implemented.
Figure 2:
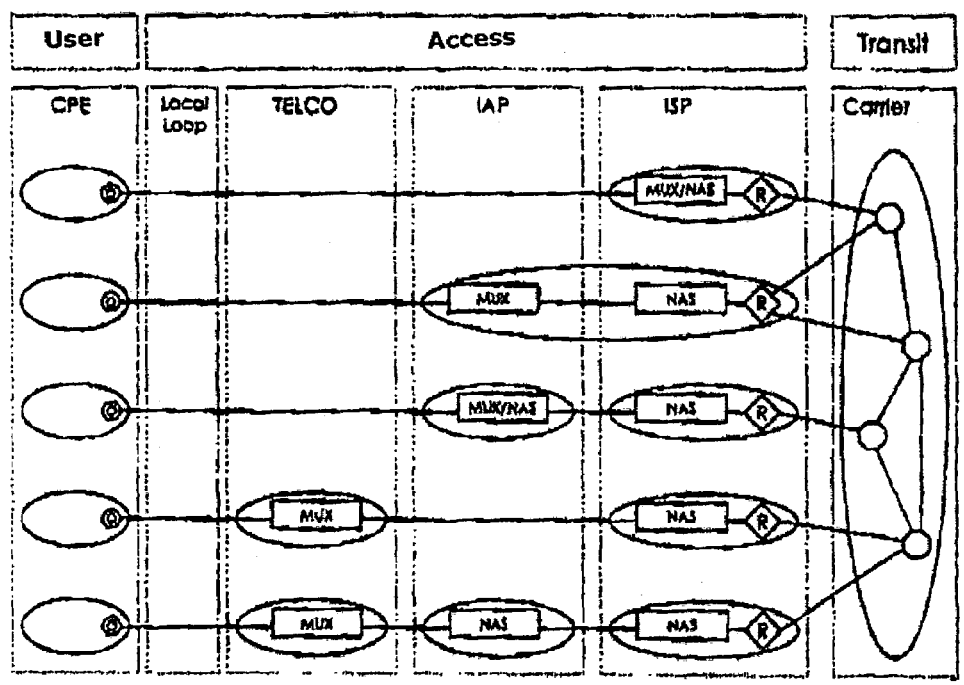
FIG. 2 shows different cases of possible access networks.
Figure 3:
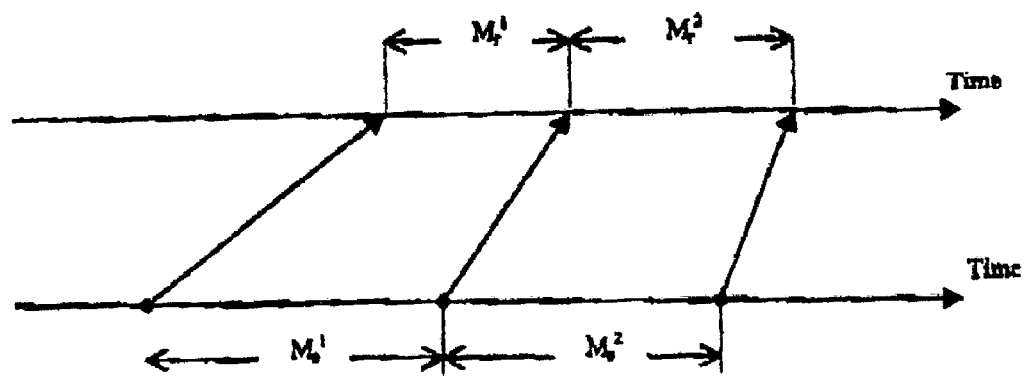
FIG. 3 illustrates a calculation method in the queue delay period according to the previous work.

Following the description, we shall call the following:

$MRTT_{sd}$: the average value of the return period for a pair of users SD.

$L_{max,\ s,\ d}$: the maximum limit value of the output from a source S to a destination D.

$L_{max,\ s,\ x}$: the maximum limit value of the output of a source S regardless of destinations.

$L_{max,\ x,\ d}$: the maximum limit value of total output to a destination D regardless of sources.

$D_{s,\ d}$: real output of a source S to destination D.

$D_{x,\ d}$: total real output to destination D regardless of sources.

$D_{s,\ x}$: total real output transmitted by source S regardless of destinations.

$R_{s,\ d}$: output reservation between source S and destination D.

Dynamic optimization process of quality service in a data transmission packet network 2, in that said network consists of a multitude of sources Si and a multitude of destinations Di connected to a transit network 4 via a multitude of access networks 6, where each source is capable of sending a maximum output Lmax, s, x and each destination is capable of receiving a maximum output Lmax, x, d, where said sources each include a classification 8 and control 10 means for the output of transmitted data.

The Quality Service elements (output, delay periods, jitter, loss) notably originate from the congestion of various network 2 parts. These phenomena are gathered under 3 categories as follows:

Category C1: collective characteristics. Phenomena due to joint activity of sub-network sources are gathered under this category. Particularly, it entails, albeit not only, the exit access to destinations.

Category C2: individual characteristics. Phenomena due to joint activity of each source independent of one another are gathered under this category. Particularly, it entails, albeit not only, the entry access in the network.

Category C3: environment characteristics. The transit network 4 is seen as the propagation environment whose characteristics change relatively slowly and independently of sub-network sources.

The suggested process is dependent on the following points:

Use of precise, numerous and absolute measures.

The relevant network does not need to be homogeneous.

Segmentation of the delay period into different parts.

Control and optimization mechanisms that use these segmented measures.

In a preferred production mode, the process according to the invention consists of the following stages:

a. Measuring the absolute transfer delay period, the jitter, the output of said exchanged data and the losses between each source S and each destination D, and performing the following sub-stages depending on the measures obtained during this stage a:

a1. for each destination D distributing the maximum output amongst the different sources.

a2. for each destination D, determining dynamically the access network congestion point limit that optimises the maximum output $L_{max,\ x,\ d}$.

a3. for each source S, determining dynamically the access network congestion point limit that optimises the overall maximum output $L_{max,\ s,\ x}$ and the maximum output towards each destination $L_{max,\ s,\ d}$.

a4. for each source S, determining the impact of the transit network congestion, and b. Monitoring the classification and control means of the output depending on results from the sub-stages a1, a2, a3 and a4.

The object of module M1 12 is to limit the traffic towards a given source so as to control the collective congestion and the sharing of access between the sub-network sources.

For a given destination D, a limit $L_{max,\ x,\ d}$ is set by using the following:

Output flow from the access line ($L_{max,\ x,\ d}$⇐output flow from access line).

Module M2 14, which determines the best common value $L_{max,\ x,\ d}$.

Configuration parameters.

This output $L_{max,\ x,\ d}$ needs to be shared amongst the active sub-network sources. In order to do this, module M1 may use the following:

An instantaneous local measure of outputs $D_{a,\ d}$ for each source.

Dynamic reservations of output $R_{a,\ d}$ done for all or some of the sources.

Static configuration data (for example, output from the access line, a set limit through subscription with the network access operator, an a priori weighting and so forth).

A possible principle consists in the destination D relaying to each source a first value $L_{max,\ x,\ d}$ which source S may not exceed when sending information to destination D (programming of limiter 10).

Preferably, the control module M1 12 for a given destination D consists of the following stages:

Setting a limit $L_{max,\ x,\ d}$ by using the output of the access line on the one hand, and module M2 14, on the other.

Sharing the limit $L_{max,\ x,\ d}$ amongst the active sources of the sub-network according to the local and instantaneous output measures $D_{a,\ d}$ for each source, as well as the dynamic output reservations $R_{a,d}$ done for all or some of the sources and the static configuration data.

Transmitting the first output value $L_{max,s,d}$ to destination D towards each source.

If, at any given moment or through construction of the access network 6, the collective congestion point to destination D is not the access line of said access network 6, the maximum usable output is below that of the access line to destination D. Further, in this case, there is a strong possibility that this maximum output is a variable in time since, for example, it is due to a concentration level in which other sources not belonging to the sub-network intervene.

It is therefore necessary to find and dynamically adapt the limit $L_{max,x,d}$ to be used by module M1 12. This is the function of module M2 14 implemented for each destination.

The principle behind the discovery of this limit considers the following relation:

QUALITY SERVICE=$F$(COLLECTIVE CHARGE)

Too significant a charge leads to a deterioration of Quality Service parameters (delay period, jitter, and losses). Too weak a charge leads to poor use of the access network, and therefore to loss of costly resources.

Figure 4:
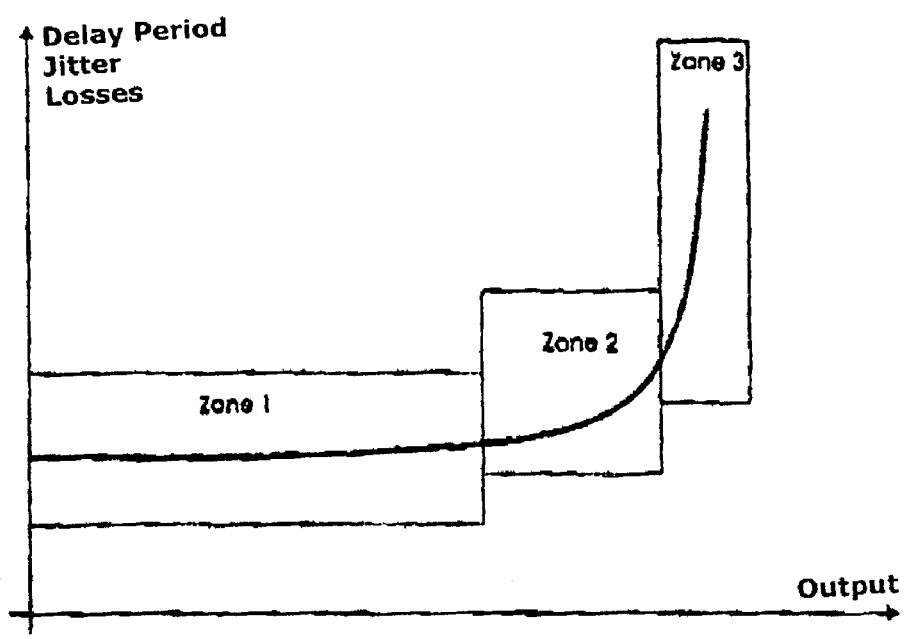
FIG. 4 shows an outline of an optimization curb of the quality service according to the invention.

FIG. 4 shows the typical speed of such a function.

There are 3 identifiable zones:

Zone 1: the quality service is relatively independent of output. Access is not congested and is probably under used.

Zone 2: the quality service begins to decline significantly with output. Access is close to congestion.

Zone 3: the quality service strongly deteriorates with a weak increase in output. Access is congested.

The ideal equilibrium point is in zone 2 where there is strong access output and controlled quality service.

Module M2 14 periodically does the following:

A calculation of a weighted value between the source for each different quality service parameter (weighted delay period, weighted jitter, weighted losses).

Determination of a curb of weighted values in relation to the measured charge $D_{x,d}$. This is determined from instantaneous measures and may call for the limit $L_{max,x,d}$ to be adjusted around a provisional functioning point to obtain a better visibility of functions.

Setting of a limit $L_{max,x,d}$ in relation to curbs and thresholds determined by parameters, especially for quality service (for example, maximum delay period or minimum loss).

If, at any given moment, the first authorised output between source S and destination D leads to a degradation of flow from this source (for example, due to the access network 6 of source S towards transit network 4 becoming congested), then this source must limit its output for fear of quality degradation.

It is therefore necessary to find and dynamically adapt the output limit $D_{s,d}$ between source S and destination D. This is the function of module M3 16 implemented in each source.

A method that may be used for module M3 16 is similar to that described for module M2 14. The limit output values to each destination are determined within the limits possibly provided by dynamic output reservations made towards all or some destinations, the static configuration data and the output from the access line. This limit output values $L_{max,s,d}$ are determined by using the curb of Quality Service values towards each destination in relation to the overall measured charge $D_{s,x}$ and towards each destination $D_{s,d}$.

Modules M5 17 monitors the classification 8 and control 10 means of output by dynamically setting the value of limiters 10 of source S in relation to values from modules M1 12 and M3 16.

Figure 5:
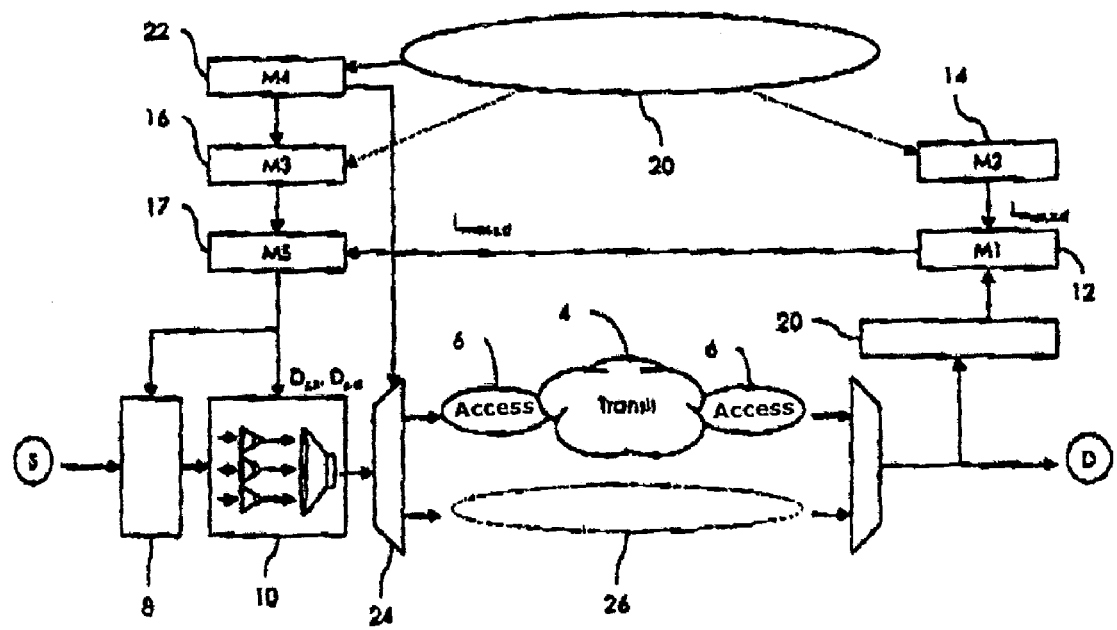
FIG. 5 shows an outline of a network in which a device according to the invention is implemented.

FIG. 5 illustrates a network example in which the process is implemented.

Figure 6:
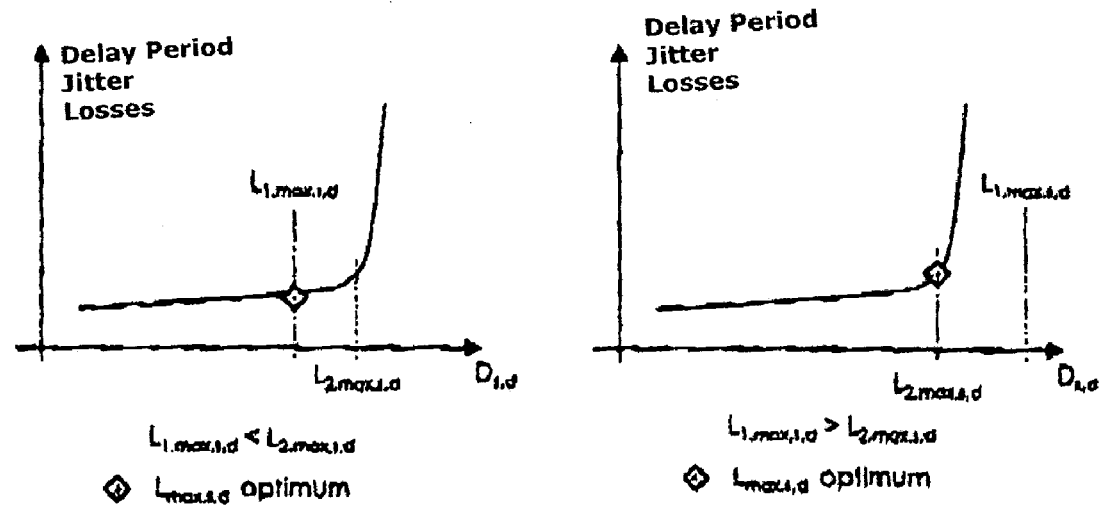
FIG. 6 shows a particular example of optimization curbs according to the invention.

FIG. 6 provides an example to determine the optimum output limit $L_{max,s,d}$ in relation to the relative positioning of the limit $L_{max,s,d}$ that is determined by module M3 16 and the limit $L_{max,s,d}$ authorised by module M1 12.

The choice of optimum output depends upon quality service targets for the relevant flow.

The method may also take overall criteria transmitted by the source into account, by calculating a weighted function of Quality Service parameters for all transmitted flows (actually, if the individual congestion takes place in the access network 6 at transit network 4, all flows from the source are involved).

In this case, the best value for the overall transmission output limit is initially determined, that will lead to an overall transmission limiter $L_{max,s,x}$ to be programmed. Subsequently, the best output to each destination D $L_{max,s,d}$ is determined, that will lead to an individual limiter 10 for flows to each destination.

FIG. 5 illustrates the optimization process according the invention in a packet network of data flow transmission.

The device intended to implement this process consists of the following:

Means 20 to measure the absolute delay period of transfer, the jitter, the output of exchanged data and losses between each source S and each destination D.

Means to distribute the maximum output $L_{max,x,d}$ amongst the different sources for each destination D.

Means to dynamically determine the limit congestion point of the access network 6 by optimising the maximum output $L_{max,x,d}$ for each destination D.

Means to dynamically determine the limit congestion point of the overall access network 6 and towards each destination for each source S.

Means to determine the impact of congestion in the transit network 4 for each source S.

Means to classify data packets transmitted in relation to their destination and the quality service required.

Means to control output flow.

Means to monitor said means of classification and said means of control.

Means of choosing the network between each source S and each destination D.

Figure 7:
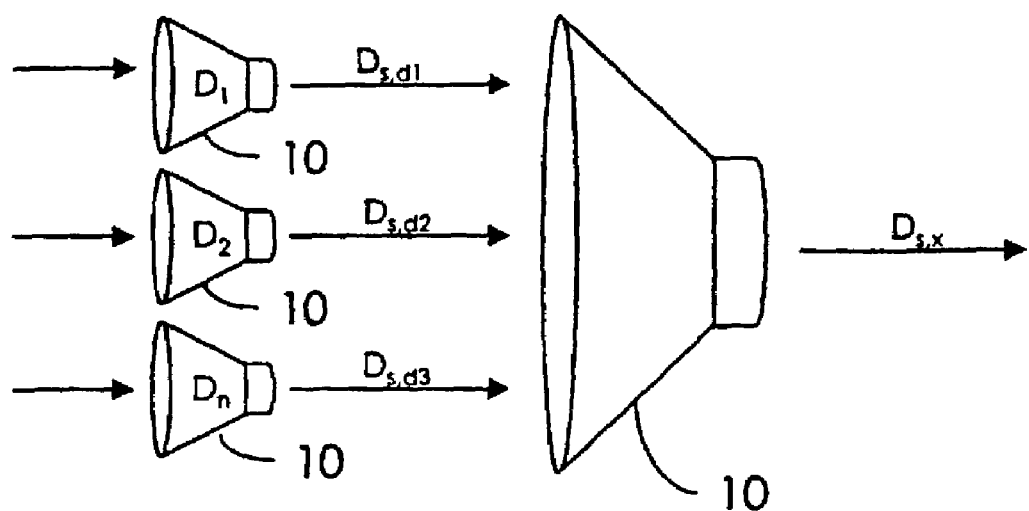
FIG. 7 shows an outline of the traffic limiters fitted on to the device according to the invention.

FIG. 7 shows an arrangement of output control means 10 consisting of overall limiters and limiters by destination exiting each source.

The transit network 4 also has an impact on quality service of flows between sources and destinations. It is possible that this quality may not correlate with the output of sources.

This impact varies in time (for example, in relation to users' activity cycle, namely day/night, peak times and so on) at a relatively slow speed to that of collective and individual congestion phenomena.

It is important to know the Quality Service that is intrinsic to transit network 4, especially to determine the best overall Quality Service that may be attained from Source to Destination, and to refine the results of modules M1 12, M2 14 and M3 16. Knowledge of this quality service is provided by module M4 22, which establishes a diagnosis on quality service between source S and each destination Di so as to monitor the selector 24 to direct all or some of the traffic towards another network.

Since the final quality service may not exceed that of the transit network, we note the following cases compared with a given quality objective:

1. Quality of transit sufficiently superior to objective, where optimization modules Ml 12, M2 14 and M3 16 are efficient.

2. Quality of transit inferior or too near objective, where optimization modules Ml 12, M2 14 and M3 16 are not enough to meet this objective. Other measures will therefore need to be taken.

In the case where the amount of circulating traffic, the optimization methods, if not the actual quality of transit network 4 would not allow a satisfactory quality service, other communication networks 26 could be implemented between sources and destinations by monitoring the selector 24, such as for example:

The use of a better quality service at a higher price on the same access connection.

Access to another service operator (instead of or in addition to the first).

A direct communication (for example, through a telephone network).

Once the precise achievable quality is known then the compromised between quality and price may be managed according to the users' own criteria.

The invention claimed is:

1. A dynamic optimization process of a quality of service (QoS) in a data transmission packet network, wherein said data transmission packet network includes a plurality of sources and a plurality of destinations connected to a transit network by a plurality of access networks, wherein each source is configured to send data at a maximum data rate $L_{max, x, d}$, and each destination is configured to receive a maximum transmission data rate $L_{max, x, d}$, wherein said sources each includes a classification and a control device configured to control a transmission data rate of transmitted data, the process comprising:

(a) measuring an absolute transfer delay period, a jitter, a transmission data rate of exchanged data, and losses between each source and each destination, and carrying out, based on the measures obtained:

(a1) for each destination distributing the maximum transmission data rate $L_{max, s, x}$ among the different sources;

(a2) for each destination, determining dynamically an access network congestion point limit that optimizes the maximum transmission data rate $L_{max, x, d}$;

(a3) for each source, determining dynamically an access network congestion point limit by optimizing the maximum transmission data rate $L_{max, s, x}$ and a maximum transmission data rate towards each destination $L_{max, s, d}$;

(a4) for each source, determining an impact of congestion on the transit network; and (b) monitoring the classification and the control of the data rate depending on results from (a1), (a2), (a3), and (a4).

2. Process according to claim 1, wherein for a selected given destination (a1) includes:

setting the maximum transmission data rate $L_{max, x, d}$ according to the data rate of an access line and to the congestion point limit determined in step (a2);

sharing said maximum transmission data rate $L_{max, x, d}$ among active sources of the network to define a first value of $L_{max, s, d}$ for each source, wherein said sharing is done by taking into account configuration data and possible dynamic data rate reservations by at least some of the sources; and transmitting said first data rate $L_{max, s, d}$ toward each source.

3. Process according to claim 1, wherein step (a2) includes:

calculating a first data rate value representing a data rate weighting between each source and said destination;

calculating a first jitter value representing a jitter weighting between each source and said destination; and calculating a first loss value representing a loss weighting between each source and said destination;

determining a curb of weighted values according to the output received by said destination; and setting the maximum transmission data rate $L_{max, x, d}$ value according to said curb of weighted values.

4. Process according to claim 1, wherein step (a3) includes:

calculating a first delay period value representing a data rate weighting between said source and each said destination;

calculating a first jitter value representing a jitter weighting between said source and each said destination;

calculating a first loss value representing a loss weighting between said source and each said destination;

determining a curb of weighted values depending on the data rate transmission used for transmitting data by said source overall and towards each destination; and determining an overall data rate $L_{max, x, d}$ value and a second maximum transmission data rate value by direction $L_{max, s, d}$ are set in relation to said curb of weighted values, output from a line towards access network, configuration and data and possible dynamic reservations of data rate towards at least some destinations.

5. Process according to claim 1, wherein for each said destination step (a4) includes:

comparing the measured values of delay period, jitter, loss, and data rate and results from (a1), (a2), and (a3) with predefined values of delay period, jitter, loss, and data rate; and establishing from said comparison a diagnosis on a quality service.

6. Process according to claim 5, further including transmitting, through the output control device, a smallest value among said first and second values of maximum transmission data rate $L_{max, s, d}$ and the maximum transmission data rate $L_{max, s, x}$.

7. Dynamic optimization device of a quality of service in a data transmission packet network, wherein said data transmission packet network includes a plurality of sources and a plurality of destinations connected to a transit network by a plurality of access networks, wherein each source is configured to send data at a maximum transmission data rate $L_{max, s, x}$ and each destination is configured to receive data at a maximum transmission data rate $L_{max, x, d}$, wherein said sources each includes a classification and a control device for output of transmitted data, wherein said device comprises:

means for measuring an absolute delay period of transfer, a jitter, the transmission data rate of exchanged data, and losses between each source and each destination;

means for distributing the maximum transmission data rate $L_{max, x, d}$ among the different sources for each destination;

means for dynamically determining a limit congestion point of the access network by optimizing the maximum transmission data rate $L_{max, x, d}$ for each destination;

means for dynamically determining the limit congestion point of an overall access network and towards each destination for each source;

means for determining an impact of congestion in the transit network for each source;

means for classifying data packets transmitted;

means for controlling the transmission data rate; and means for choosing the access network for each source towards each destination.

8. Device according to claim 7, further comprising:

a first module responsible for dynamically determining a first maximum transmission data rate $L_{max, s, d}$ that a selected source may use for sending data to a selected destination;

a second module responsible for dynamically determining an overall maximum transmission data rate $L_{max, x, d}$ that the selected destination may use for receiving the data in order to have optimum use of an access line while monitoring quality service;

a third module responsible for dynamically determining the overall maximum transmission data rate $L_{max, s, d}$ that the selected source may use for transmitting to a destination to have an optimum use of the access line while monitoring quality service;

a fourth module responsible for dynamically determining the characteristics of the transit network and for controlling a network selector; and a fifth module for monitoring the classification and transmission data rate control device output by dynamically setting a limiter value of the selected source in relation to values from the first and third modules.

9. Device according to claim 7, wherein the dynamic entry parameters of the module include:

transmission data rate measures;

values of transmission data rate reservation between each source and destination; and the maximum transmission data rate $L_{max, x, d}$ that the selected destination may receive from all sources, as determined by the second module.

10. Device according to claim 7, wherein the second module calculates, by using measures of quality service, quality service weighted variables between all sources and deduces the maximum transmission data rate $L_{max, x, d}$ that the selected destination may receive from the network.

11. Device according to claim 8, wherein the third module receives the first value $L_{max, a, x}$ from the first module of each destination and calculates, by using measures of quality service, quality service weighted variables between all destinations and provides the maximum transmission data rate $L_{max, a, x}$ that the selected source may transmit to the network and the second maximum transmission data rate values $L_{max, s, d}$ that the selected source may transmit to each destination.

12. Device according to claim 7, wherein the fourth module establishes a diagnosis on the quality service between the selected source and each destination to monitor a selector that directs all or some of the traffic to another network.

* * * * *

UNITED STATES PATENT AND TRADEMARK OFFICE
CERTIFICATE OF CORRECTION

PATENT NO. : 7,333,434 B2  Page 1 of 1
APPLICATION NO. : 10/182894
DATED : February 19, 2008
INVENTOR(S) : Thierry Grenot et al.

It is certified that error appears in the above-identified patent and that said Letters Patent is hereby corrected as shown below:

On the title page, Item (30), the Foreign Application Priority Data is incorrect. Item (30) should read as follows:

-- (30)  Foreign Application Priority Data

Feb. 3, 2000  (FR)........................ 00 01360 --

Signed and Sealed this

Third Day of June, 2008

JON W. DUDAS
*Director of the United States Patent and Trademark Office*